Feb. 10, 1970     D. D. BOCK     3,495,092
FAIL SAFE VOLTAGE-TO-CURRENT TRANSLATING CIRCUIT
Filed Oct. 25, 1966     2 Sheets-Sheet 1

INVENTOR.
DONALD D. BOCK
BY
HIS AGENT

Feb. 10, 1970   D. D. BOCK   3,495,092
FAIL SAFE VOLTAGE-TO-CURRENT TRANSLATING CIRCUIT
Filed Oct. 25, 1966   2 Sheets-Sheet 2

INVENTOR.
DONALD D. BOCK
BY
HIS AGENT

United States Patent Office 3,495,092
Patented Feb. 10, 1970

3,495,092
FAIL SAFE VOLTAGE-TO-CURRENT TRANSLATING CIRCUIT
Donald D. Bock, Erie, Pa., assignor to General Electric Company, a corporation of New York
Filed Oct. 25, 1966, Ser. No. 589,250
Int. Cl. H02j 1/00, 3/00
U.S. Cl. 307—9                    4 Claims

ABSTRACT OF THE DISCLOSURE

A fail-safe circuit for translating a variable voltage signal, such as a tractive effort signal, into a variable current signal wherein the variable voltage signal is amplified by a summing amplifier whose output is coupled to a current amplifier. Negative feedback is provided from the current amplifier to the input of the summing amplifier. Power from one power source is applied through a feedback resistor to one terminal of the current amplifier and returned through the output terminal of the power amplifier and through the load to the power source. Summing amplifier power is supplied by a second power source which is interconnected with the first power source for fail-safe operation. A latching circuit disables application of current to the load in the event the output current deviates excessively from the magnitude corresponding to the variable voltage input signal.

---

This invention relates to a fail safe translating circuit for interconnecting a signal source and a variable impedance load, and more particularly, it relates to a fail safe voltage-to-current translating circuit for interconnecting a tractive effort control system and a vehicle propulsion system of a rapid transit or other railway vehicle.

While this invention is capable of numerous applications wherever voltage-to-current translation is required, it will be described in detail with respect to its application in an automatic railway vehicle control system.

Control systems for automatically controlling the operation of vehicles include circuit portions which calculate the varying tractive efforts needed for vehicle control. These tractive effort control signals vary over a preselected voltage range in accordance with the tractive effort required for a desired vehicle operation. The tractive effort signals must be transferred to the vehicle propulsion and braking system to either increase the tractive effort for a train by increasing the energization of its traction motors or decrease the tractive effort of the train by either decreasing motor energization or actuating the vehicle braking system.

Since it is advantageous to employ noise-free, current-type signals, the tractive effort signals may have to be transferred through low impedance coupling circuits, such as saturable reactor control windings, to each of the train cars. Operation of a rapid transit system requires that cars be added to a train for the convenience of riders during peak train load periods and subtracted from the train for the normal load periods. Changes in the number of cars results in a change in the number of low impedance coupling circuits utilized for these different operating conditions which tends to affect the output of the control system.

Since rapid transit trains carry human passengers, transfer circuits for use with their control systems must comply with the fail safe requirement imposed on all train components. That is, when one of the more common modes of failure occurs, it should cause the train to slow down or stop rather than to accelerate.

Therefore, it is an object of this invention to provide a fail safe, voltage-to-current translating circuit for use between a signal source and a load.

It is another object of this invention to provide a fail safe voltage-to-current translating circuit for use between a vehicle tractive effort control system and a vehicle propulsion system.

It is another object of this invention to provide a fail safe voltage-to-current translating circuit especially adapted for operation with a variable low impedance load.

It is a further object of this invention to provide a voltage-to-current translating circuit which fails in a safe manner when a circuit output line is shorted to an electrical reference point.

Briefly stated, in accordance with one aspect of this invention, a circuit is provided for translating voltage-type input signals to proportional current-type output signals. Computation means are provided to generate error signals in response to deviations in the proportionality between the voltage signals and the current signals. An amplifier provides the current output signals in response to the computation means. A first power supply is provided for the computation means and a second power supply is provided for the amplifier. One terminal of the second power supply is connected to a reference point for the circuit, while another terminal of the second power supply is connected to a terminal of the first power supply to provide a common point for these power supplies. Should the amplifier fail by having its output circuit shorted to the reference point, the error signal remains proportional to the deviation of the current signal caused by the short.

Means may also be provided for responding to preselected deviations of the current output signal, which occur without corresponding changes in the voltage input signal, to prevent current flow from the amplifier.

The specification concludes with claims particularly pointing out and distinctly claiming the subject matter of this invention. The organization and manner and process of making and using this invention, together with further objects and advantages thereof, may be best understood by reference to the following description taken in conjunction with the accompanying drawings in which:

Figure 1:
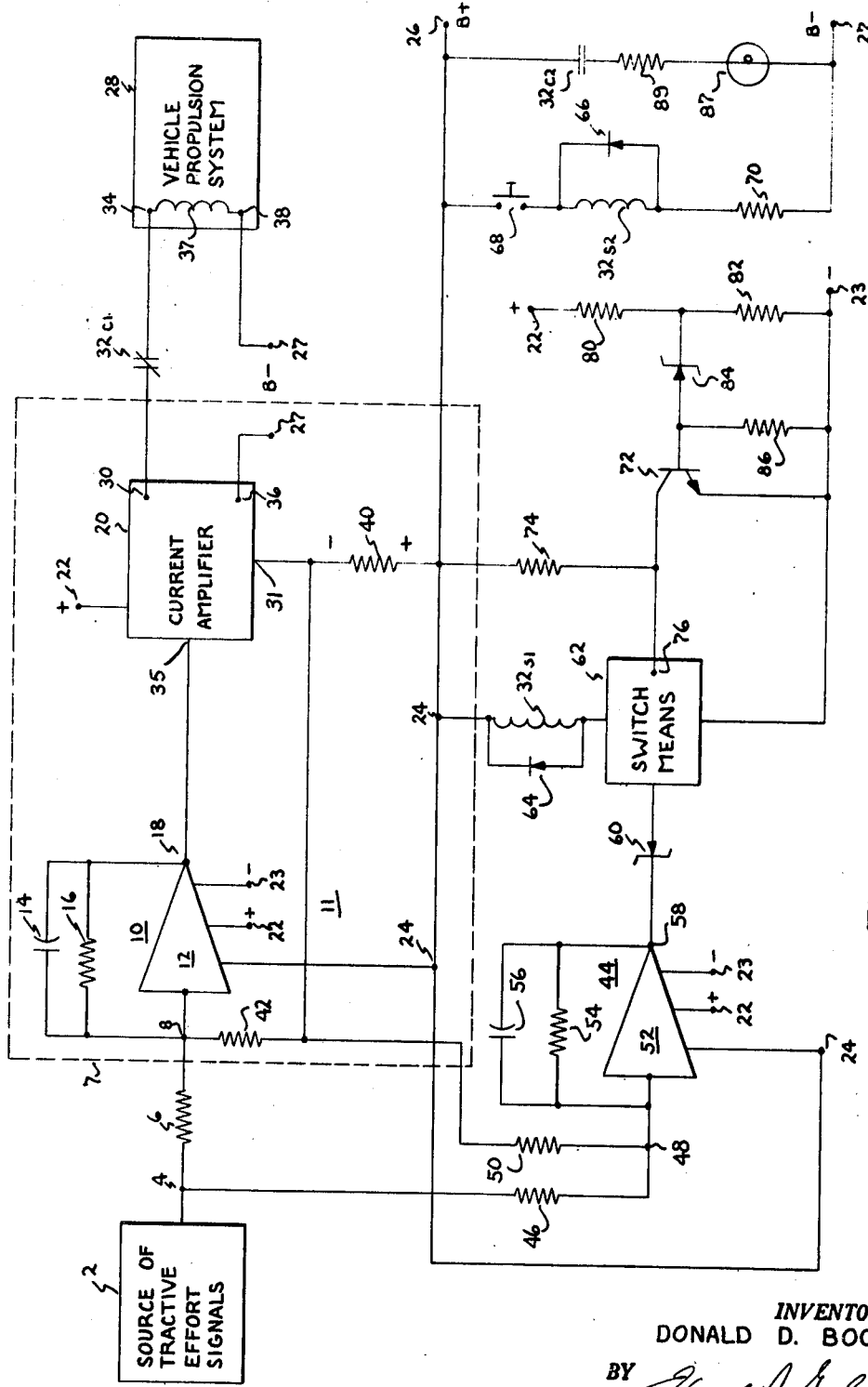
FIG. 1 is a schematic circuit diagram of a rapid transit control system using a voltage-to-current translator in accordance with one embodiment of this invention.

FIG. 1 shows a schematic circuit diagram of one embodiment of the invention. As shown, a voltage-to-current translating circuit comprises means for applying a current-type signal to apparatus to be controlled. It further includes means for computing whether this current-type signal remains proportional to an input signal and for compensating for any deviations which occur. Input signals are coupled from a signal source, such as a source of tractive effort signals 2, and through an input terminal 4 and resistance 6 to a closed loop control circuit 7.

This closed loop control circuit 7 can supply the compensated current-type signals discussed above. A computation section is provided for comparing the input signal with a signal representative of the output signal. The resistor 6 is coupled through a summing junction 8 at the input of a summing amplifier means 10. The amplifier means 10 comprises means for amplifying the sum of the input signal and a signal coupled through a current feedback network 11. In the embodiment of the invention illustrated in FIG. 1 amplifier means 10 includes a high gain differential amplifier 12 having a feedback capacitor 14 and a large resistance 16. The capacitor 14 is a stabilizing capacitor to prevent the closed loop control circuit from oscillating. The resistor 16 sets the gain of amplifier 12.

The signal from the output of summing amplifier input 35 of means 10 is coupled from terminal 18 to means for converting it to a current-type signal. This means is shown to include a current amplifier 20, which may comprise an odd number of signal-inverting type amplifying stages. The output from the current amplifier 20 is coupled through output terminals 30 and 36 to a means to be controlled, such as a vehicle propulsion system 28 having a low impedance input, shown as a control winding 37 of a magnetic amplifier.

Figure 2:
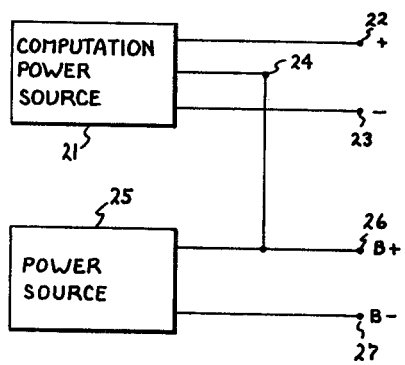
FIG. 2 is a schematic circuit diagram of a power supply in accordance with this invention.

Referring to FIG. 2, means are provided for supplying power in a fail safe manner to the computation section and the current amplifier section of the voltage-to-current translator. The power supplying means comprise a computation section power source 21 having a terminal 22 biased at a positive potential, a terminal 23 at a negative potential, and a common terminal 24 biased at a potential between them. The power supplying means further comprise a power source, or train battery, 25 for the current amplifier 20. The power source 25 includes a terminal 26 which is biased at a positive potential, referred to as B+, and a terminal 27 which is biased at a negative potential, referred to as B—. The common terminal 24 of the source 21 is tied to the terminal 26 of the source 25. Among the numerous alternative arrangements which may use the principles of this invention is one in which the terminal 23 may be biased from the terminal 27 instead of providing the power supply 21 with the capability of generating a negative voltage.

The terminal 27 is normally tied to a point of reference, which may be a car body in a rapid transit control system. However, this terminal is not the common point between the power source 21 and the power source 25. Rather, the terminal 26 is the common point for the power supplies, being tied to the common terminal 24. This allows the computation section, including the summing amplifier means 10, to continue to compensate for the tendency to increase the output current due to a short in the output circuit.

In one embodiment of this invention, a low impedance sampling resistance 40 is coupled between the common point 24–26 and the summing junction 8 in the feedback network 11. Should the translating circuit fail by shorting the output line from an output terminal 30 to the same reference point to which the terminal 27 is attached, such as a train car body or ground, output current is not shunted from this resistance. Rather, this resistance continues to feed signals representative of the output current level back to the summing amplifier 10 which generates corrective error signals. The closed loop circuit 7 continues to correct for changes in the output current not caused by corresponding changes in the tractive effort signals. An important feature of this arrangement is coupling the resistance 40 to a terminal 31 of the output section, of amplifier 20, such that a short in the circuit leading from the output terminals does not shunt current from this resistance.

Means are provided for coupling current signals from the power amplifier 20 to the propulsion system 28. The coupling means include normally closed contacts $32C_1$ of a relay 32, connected between the terminal 30 and a terminal 34 of the propulsion system 28. The terminal 36 is coupled through the reference terminal 27 to a terminal 38 of the propulsion system 28. The relay 32 also includes normally open contacts $32C_2$. It further includes a "set" solenoid $32S_1$ and a "reset" solenoid $32S_2$. These latter relay components, discussed in more detail below, are part of a circuit which responds to changes in the current amplifier output which occur without corresponding changes in the signal level at the input of the translator circuit.

Output power for the current amplifier 20 is coupled from the B+ terminal 26 and through a portion of the current feedback network 11, which includes the sampling resistance 40. As shown in the drawing in FIG. 1, the voltage drop across the resistance 40 is such that a negative feedback signal is developed. This feedback signal is coupled through a resistance 42 in the feedback network 11 to the junction 8 at the input of the amplifier 12.

A summing amplifier 44 comprises means for responding to errors in the current-type output signal which might cause the translating circuit to fail in a non-safe manner. Means comprising a resistor 46 couple signals from the input terminal 4 to a second summing junction 48. A resistor 50 couples feedback signals from the sampling resistance 40 to the summing junction 48. The impedance of the resistor 46 may equal that of the resistor 6, and the impedance of the resistors 42 and 50 may also be equal. Changes in the signal level at the input terminal 4 and the changes in current flow through the sampling resistance 40 then have an equal effect on each of the summing amplifiers 10 and 44. The summing amplifier 44 comprises means for amplifying the sum of the input signal and the current feedback signal, such as a high gain amplifier 52 having a feedback network comprising a resistor 54 and a capacitor 56. The resistor 54 determines the gain of the amplifier 52. The capacitor 56 adds a time delay which prevents response of the amplifier 52 to transient error indications which occur when the inductive control winding 37 delays in responding to signals from the amplifier 20, due to the inductive nature of the vehicle propulsion system 28. The amplifier 52 is energized by the power source 21 through the terminals 22, 23 and 24.

Means are provided for responding to current amplifier output signals which have increased a predetermined amount above the signal level determined by the input signals from the source 2. Signals at an output terminal 58 of the amplifier 44 are coupled through a breakdown diode device such as a Zener diode 60 to a normally open switch means 62. A free-wheeling diode 64 is connected across a solenoid $32S_1$. This "set" solenoid $32S_1$ of relay 32 is connected to the common terminal 24 and to the terminal 23 of the power source through the switch means 62. When the output from the amplifier 44 increases to a level above the breakdown level of the diode 60, as the output current from the amplifier 20 increases without a corresponding increase in the signal level from the signal source 2, the switch means 62 is activated, energizing the "set" solenoid $32S_1$. The "reset" solenoid $32S_2$, having a free-wheeling rectifier 66, is connected through a resistor 70 and a manually operated switch 68 to the terminals 26 and 27 of the power source 25.

A circuit is provided for sensing when the voltage level of the computation power supply 21 decreases below a predetermined minimum level. This circuit comprises a transistor 72 having its collector electrode coupled through a resistor 74 to the terminal 26 and coupled to an input terminal 76 of the switch stage 62. The positive voltage terminal 22 of the power supply 21 is coupled through a voltage divider comprising resistors 80 and 82 to the cathode of a breakdown device such as Zener diode 84 to normally keep the transistor 72 conducting. A resistor 86 connects the anode of diode 84 and the base of the transistor 72 to ground. As long as the transistor 72 conducts current, the switch means 62 remains deactivated. Once this transistor stops conducting, the switch means 62 is activated and the solenoid $32S_1$ is energized.

During the normal operation of the circuit shown in FIG. 1, the signal source 2 generates tractive effort signals which vary in magnitude over a predetermined voltage range to vary the tractive effort of the vehicle propulsion system 28. In a particular application where the predetermined voltage range is, for example, from zero to 22 volts, an output of zero volts is used to schedule full braking effort for the vehicle, while an output of 22 volts schedules full propulsion effort. When the voltage level of the tractive effort signal is approximately 10.5 volts, the vehicle is in its coasting mode of operation.

Tractive effort signals at the input terminal 4 are amplified and inverted by both the high gain amplifier 12 and the current amplifier 20 so that signals at the output terminal 30 are in phase with signals at the input terminal. The output current flow through the low impedance sampling resistance 40 can be changed by a change in the tractive effort signals at the input terminal 4 or by changes in the load conditions of the power amplifier 20. Where, for example, the output current flow through the sampling resistance 40 increases due to an increase in the tractive effort signals, the increased current flow through the resistor 6 toward the summing junction 8 is balanced by a subsequent increase in current flow away from the summing junction 8 through the resistor 42. Where an increased current flow through resistor 40 is due to some other reason, the larger signal at the resistor 40 decreases the output from the summing amplifier 10, and ultimately from the power amplifier 20, by drawing less current away from the terminal 18, through the resistor 16. The common terminal 24 of the power source 21 is tied to the terminal 26 of the power supply 25 so that the sampling resistor 40 is referenced to these terminals. Should the translating circuit fail by shorting a line from the terminal 30 to the reference terminal 27, the feedback circuit 11 performs as usual. Furthermore, since the common terminal 24 is tied to the B+ terminal 26, the current feedback signal can be coupled from the resistor 40 to the junction 8 without an inverting stage to make it a negative feedback signal.

The summing amplifier 44 is sensitive to changes in signal level at the input terminal 4 and across the sampling resistor 40. Where increases in current through the sampling resistor 40 are responsive to increases in tractive effort signal at the terminal 4, the signals are balanced out at the summing junction 48. Where the current flow through the resistor 40 decreases due to a change in the load impedance, the output from the summing amplifier 44 decreases accordingly. The diode 60 continues to prevent the decreasing output from affecting the switch stage 62. This decrease in the load current tends to decrease the vehicle speed, causing the system to fail in a safe manner.

However, when the voltage across the sampling resistor 40 increases for some reason other than an increase in tractive effort signal level, the system tends to fail in an unsafe manner. That is, this failure causes the vehicle to accelerate. A more negative signal is coupled from the sampling resistor 40 and through the resistor 50 to the summing junction 48. This signal causes a more positive output signal at the terminal 58. When this signal increases to a level above the breakdown level of the diode 60, the signal is coupled to the switch stage 62 to connect the "set" solenoid $32S_1$, across the terminals 23 and 24 and energize this solenoid. This opens the contacts $32C_1$ and the circuit between the power amplifier 20 and the vehicle propulsion system 28. Current stops flowing to the propulsion system 28 so that the controlled train slows down.

Once the terminals $32C_1$ are opened, the "reset" solenoid $32S_2$ must be energized to close them. The manual switch 68 can connect the solenoid $32S_2$ across the power supply 25 to return the contacts of the relay 32 to their normal condition.

The voltage level across the terminals 22 and 23 is sensed by the transistor 72 and the Zener diode 84. As long as the voltage coupled to the cathode of the diode 84 is above the breakdown voltage level of the diode, the transistor 72 shunts current from the resistor 74, away from the terminal 76 of the switch stage 62. When the voltage level at the cathode of the diode 84 decreases below the breakdown voltage level, the transistor 72 stops conducting and current flows through the resistor 74 and the input terminal 76 to activate the switch stage 62. The solenoid $32S_1$ is energized and the contacts $32C_1$ are opened.

Figure 3:
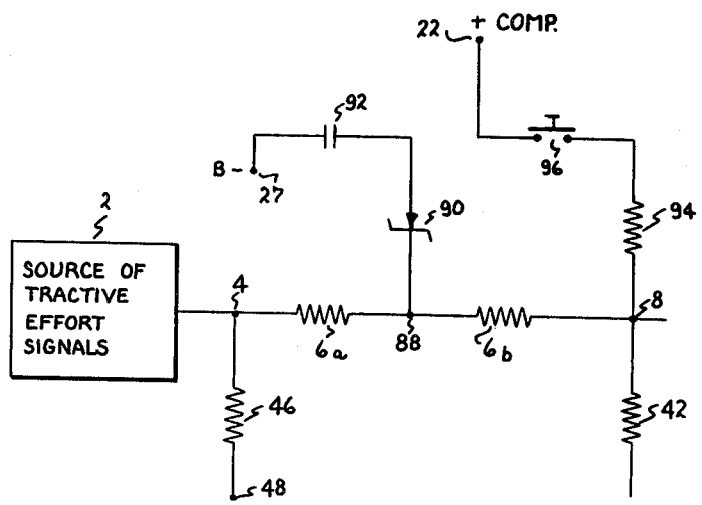
FIG. 3 is a schematic circuit diagram illustrating modifications of a portion of the system shown in FIG. 1.

FIG. 3 shows the addition of a "low performance" circuit and an error sensing testing circuit to the circuit shown in FIG. 1. The resistor 6 connected between the input terminal 4 and the summing junction 8 in FIG. 1 is split into two resistors $6_a$ and $6_b$ in FIG. 3. The "low performance" circuit is connected to a junction 88 between these two resistors. The cathode of a breakdown diode device such as a Zener diode 90 is connected to the junction 88, while the anode is coupled through normally open contacts 92 to ground. These contacts may be controlled by a solenoid or other suitable means convenient to the circuit. When the rails upon which a rapid transit vehicle operates are slippery or some other condition requires that a train be operated at tractive effort no higher than a predetermined maximum, the contacts 92 are closed. The voltage at the junction 88 cannot increase above the breakdown level of the diode 90, limiting the input voltage to the summing amplifier 10 and thus limiting the maximum vehicle tractive effort.

A circuit is included for testing the fail-safe error sensing circuit while the controlled train is standing still. This testing circuit comprises a relatively high impedance resistor 94 which is coupled through a normally open manual switch 96 to the terminal 22 of power source 21. This testing circuit synthetically increases the output called for at the summing junction 8 of the amplifier 10 without a corresponding increase in the input signal at the summing junction 48 of the amplifier 44.

When the contacts 96 are closed, the output of the amplifier 10 is increased, thereby increasing the output current flow through the output terminal 30 and the sampling resistance 40. The increased voltage at the sampling resistance 40 is coupled through the resistor 50 to the amplifier 44. Since there has been no increase in the signal level at the input terminal 4, the signal level at the junction 48 is comparable to that present when an error has occurred. If the circuit 44 is operating effectively the increased signal at the sampling resistor 40 causes the amplifier 44 to turn on the switch stage 62 to open the contacts $32C_1$. A fault indicating light 87 coupled through a resistor 89 and contacts $32C_2$ across a portion of the circuit power supply shows that the error sensing circuit has been actuated.

This invention is not limited to the particular details of the preferred embodiments illustrated. It is contemplated that various modifications and applications within the scope of this invention will occur to those skilled in the art. It is therefore intended that the appended claims cover such modifications which do not depart from the spirit and scope of this invention.

What I claim as new and desire to secure by Letters Patent of the United States is:

1. For use in a rapid transit control system including a source of tractive effort voltage signals and a propulsion system, a fail-safe circuit for translating the tractive effort voltage signals to current signals, comprising, in combination:
 (a) a closed loop control circuit including a current amplifier for providing the current signals, said current amplifier having a low impedance feedback resistance connected in its output circuit, said closed loop control circuit adapted to be connected between the tractive effort signal source and propulsion system;
 (b) summing amplifier means including a summing junction and summing impedance means;
 (c) first means responsive to a preselected output of said summing amplifier to prevent current flow from said closed loop circuit to the propulsion system; and
 (d) second means adapted to connect the source of tractive effort signals to said summing junction, and third means for connecting said summing impedance between said feedback resistor and said summing junction to cause said summing amplifier to respond to predetermined changes in the current signals which occur without corresponding changes in the tractive effort signals.

2. A circuit according to claim 1 wherein said first means includes switch means connected to the output of said current amplifier means and adapted to be connected to the propulsion system.

3. A circuit according to claim 1 wherein said closed loop control circuit also includes:
   (a) computation means coupled to said feedback resistance and adapted to be connected to the source of tractive effort signals to respond to changes in the current signal which occur without corresponding changes in the tractive effort signals;
   (b) a first power supply connected to said computation means for energizing said computation means, said first power supply including first and second power supply terminals;
   (c) a second power supply connected to said current amplifier for energizing said current amplifier, said second power supply including third and fourth power supply terminals;
   (d) means adapted to connect said third power supply terminal to a reference point for the rapid transit control system;
   (e) means for connecting said first power supply terminal to said fourth power supply terminal; and
   (f) means for connecting said feedback resistance between said fourth power supply terminal and a point in said current amplifier such that any failure which shorts an output terminal thereof to the reference point does not decrease the current flow through said feedback resistance.

4. For use in a control system for controlling the tractive effort of one or more rapid transit vehicles wherein voltage-type tractive effort signals are generated by a calculating circuit and are transferred to a vehicle propulsion and braking system as current-type signals, an improved circuit for translating the voltage-type signals to current-type signals including in combination:
   (a) computation means having an input (8) and an output (18), the input of said computation means being adapted to be connected to the calculating circuit;
   (b) amplifier means having an input (35) and first (30) and second (31) output terminals;
   (c) means for interconnecting the output of said computation means to the input of said amplifier means;
   (d) a computation power supply (21) connected to said computation means for energizing said computation means, said computation power supply including first (24) and second power terminals (22, 23);
   (e) a rapid transit vehicle battery (25) for energizing said amplifier means, said battery having third (27) and fourth (26) power terminals;
   (f) means for connecting said third power supply terminal to a reference point for said translating circuit;
   (g) means (32c–1) adapted to couple said vehicle propulsion and braking system (28) between the first output terminal of said amplifier and said third power supply terminal;
   (h) a feedback resistor connected from said second terminal of said amplifier to said fourth power supply terminal;
   (i) means for connecting said first power terminal to said fourth power terminal;
   (j) means for coupling the junction of said feedback resistor and said second terminal of said amplifier to the input of said computation means, such that said computation means generates error signals proportional to the deviation of the current signals from a preselected relationship to the voltage signals.

References Cited

UNITED STATES PATENTS

| 3,334,224 | 7/1967 | Allen et al. |
| 3,363,096 | 1/1968 | Hughson et al. |

ROBERT K. SCHAEFER, Primary Examiner

D. SMITH, Jr., Assistant Examiner

U.S. Cl. X.R.

105—61; 317—123; 318—494; 246—187